United States Patent [19]

James et al.

[11] Patent Number: 4,572,669

[45] Date of Patent: Feb. 25, 1986

[54] METHOD AND APPARATUS FOR A FABRY-PEROT MULTIPLE BEAM FRINGE SENSOR

[75] Inventors: Kenneth A. James, Corona Del Mar; William H. Quick, La Habra Heights; Virgil H. Strahan, Orange, all of Calif.

[73] Assignee: Rockwell International Corporation, El Segundo, Calif.

[21] Appl. No.: 83,489

[22] Filed: Oct. 10, 1979

Related U.S. Application Data

[63] Continuation-in-part of Ser. No. 5,265, Jan. 22, 1979, Pat. No. 4,329,058.

[51] Int. Cl.⁴ .............................................. G01B 9/02
[52] U.S. Cl. .................................. 356/352; 356/346; 356/357
[58] Field of Search ........................... 250/227, 231 R; 350/96.15; 356/352, 357, 358, 361, 346, 35.5; 73/800

[56] References Cited

U.S. PATENT DOCUMENTS

| | | | |
|---|---|---|---|
| 3,470,329 | 9/1969 | Young | 356/352 |
| 3,614,236 | 10/1971 | Steinemann | 356/352 |
| 3,619,463 | 11/1971 | Bodin | 356/352 |
| 3,635,562 | 1/1972 | Catherin | 356/352 |
| 3,704,996 | 12/1972 | Borner | 350/96.15 |
| 4,053,764 | 10/1977 | Sierak | 350/96.15 |
| 4,076,422 | 2/1978 | Kohno | 356/346 |
| 4,160,600 | 7/1979 | Luke | 356/352 |
| 4,270,050 | 5/1981 | Brogardh | 73/800 |

FOREIGN PATENT DOCUMENTS 1184594  3/1970  United Kingdom ................. 356/352

OTHER PUBLICATIONS

Loughhead et al., "Instrumental Profile of a Triple Fabry-Perot Interferometer for Use in Solar Spectroscopy", App. Optics, 2-1-78, pp. 415-419.
Peterson et al., "Interferometry & Laser Control with Solid Fabry-Perot Etalons", App. Optics, 6-1966, pp. 985-991.

*Primary Examiner*—William H. Punter
*Attorney, Agent, or Firm*—Morland C. Fischer; H. Fredrick Hamann

[57] ABSTRACT

A method and, in one embodiment of the invention, the resulting apparatus for implementing a unique multiple beam fringe sensor that is adapted to be interfaced with a low cost, compact fiber optic transmission system in order to provide an accurate digital representation of a physical parameter (e.g. temperature) of a remote sample. The sensor is fabricated so as to include a Fabry-Perot gap formed between the ends of two mated optical fibers. By examining the optical characteristics of light that is transmitted through the Fabry-Perot sensor gap, an indication of gap width can be ascertained. Accordingly, a change in Fabry-Perot sensor gap width is related to a change in the particular physical parameter to be measured.

In another embodiment of the invention, a second unique multiple beam fringe sensor having a Fabry-Perot gap is disclosed that is also adapted to provide an accurate digital representation of a physical parameter (e.g. temperature) of a remote sample. The sensor may be fabricated in two segments. A fiber containing segment includes each of a driving optical fiber for supplying incident light signals to the Fabry-Perot gap and a sensing optical fiber for receiving output light signals that have been transmitted twice through the Fabry-Perot gap, the optical characteristics of which output signals provide an indication of the parameter to be sensed. A transducer segment includes the Fabry-Perot gap formed therein and means responsive to the physical parameter for changing the width of the Fabry-Perot gap and, accordingly, the optical characteristics of the light signals passing therethrough.

18 Claims, 12 Drawing Figures

METHOD AND APPARATUS FOR A FABRY-PEROT MULTIPLE BEAM FRINGE SENSOR

The invention described herein was in the performance of work done under NASA Contract No. NAS3-21005 and is subject to the provisions of Section 305 of the National Aeronautics and Space Act of 1958 (72 Stat. 435; 42 USC 2457).

CROSS REFERENCE TO RELATED PATENT APPLICATIONS

This patent application is a continuation-in-part of patent application Ser. No. 005,265 filed Jan. 22, 1979, now U.S. Pat. No. 4,329,058.

BACKGROUND OF THE INVENTION

1. Field of the Invention

This invention relates to a method for fabricating and, in accordance with different embodiments of the invention, apparatus comprising Fabry-Perot multiple beam fringe sensors that are each suitable to provide an accurate digital representation of a physical parameter.

2. Prior Art

Conventional sensors which are adapted to measure various physical characteristics of a sample typically provide an analog output signal. Consequently, should a digital representation of an output signal be desired, relatively expensive and space consuming analog-to-digital equipment is required. Moreover, such conventional analog sensors are limited in application, because of their inherently large size and slow response time. Moreover, either complex transmission lines or signal conversion apparatus is typically required when the sensor must collect information from a remote sample. Hence, prior art transmission systems that have heretofore been interfaced with sensors of the prior art are relatively expensive to fabricate, are not capable of carrying sufficiently wide bandwidth signals, lack immunity to electro-magnetic and/or electro-static interferences, and require numerous interfacing apparatus.

An example of an optical sensor that is interfaced with a fiber optic transmission system to provide accurate digital representations of a physical parameter from a remote sample can be found in U.S. Pat. No. 4,223,226 issued Sept. 16, 1980. However, nothing is known in the prior art which shows or suggests the claimed method for fabricating and apparatus comprising a unique multiple beam fringe sensor that includes a Fabry-Perot cavity, so that the optical characteristics of light transmitted through said cavity provide an indication of the change of a physical parameter to be measured. While Fabry-Perot techniques have been previously utilized in non-sensing applications (such as in the construction of a laser), nothing is known in the prior art which applies Fabry-Perot optical principles to an apparatus for sensing physical parameters, such as that disclosed and claimed below.

SUMMARY OF THE INVENTION

Briefly, and in general terms, a method for fabricating a unique Fabry-Perot multiple beam fringe sensor is disclosed, which sensor has particular application for providing a digital representation of the physical parameters of a remote sample. In accordance with the present invention, the preferred method of fabrication includes the steps of spherically terminating one end of each of a pair of suitable glass or silica optical fibers. Each of the spherical ends are polished so that enlarged flat surfaces are respectively formed, whereby the end of each optical fiber is hemispherically terminated. A raised cylindrical contact is formed on one of the polished flat surfaces of a first of the pair of hemispherically terminated optical fibers. A hollow spacer is applied around the periphery of the raised cylindrical contact. In one preferred embodiment, it is desirable that the materials used to form the cylindrical contact and the hollow spacer have different temperature coefficients of expansion. The raised cylindrical contact is shortened, whereby the end surface thereof is recessed with respect to the end surface of the spacer. The sensor is assembled by mating the end surface of the spacer of the first optical fiber with the polished, flat end surface of the second of the pair of optical fibers, such that a narrow Fabry-Perot gap is formed between the respective ends of the shortened cylindrical contact and the second optical fiber.

The multiple beam fringe sensor of the present invention is interfaced with a fiber optic transmission and detection system so that light is transmitted through the narrow Fabry-Perot gap. The sensor operates in a manner whereby the Fabry-Perot gap causes a plurality of reflections and splittings of a single beam of incident light, such that constructive and destructive interference of the components of the incident light beam may occur numerous times. The instant sensor has the desirable characteristic that the spectral characteristics of the output light signal are directly related to both the known wavelengths of the incident light beam and to the dimensions of the gap. By decoding the information transmitted by the sensor optical output signals, a digital indication of changing Fabry-Perot gap width can be obtained, which gap width can provide a representation of the change of a physical parameter, such as pressure, temperature, and the like.

In another embodiment of the present invention a multiple beam fringe sensor for measuring a physical parameter (e.g. temperature) is disclosed comprising driving and sensing optical fibers for supplying incident light beams to and for receiving reflected light beams from a sensor mirror surface. The incident and reflected light beams are each transmitted through the Fabry-Perot gap, whereby the sensor bandpass is narrowed so as to maximize sensing accuracy. The sensor is arranged so that the incident and reflected light beams pass through the Fabry-Perot gap at a small angle with respect to the longitudinal axis of the sensor. This transmission angle advantageously prevents unwanted reflections occurring at the Fabry-Perot gap from being undesirably focused on the sensing optical fiber in order to maximize the resolution of the output signals being transmitted by said sensing fiber. A temperature sensitive tubular element surrounds the sensor Fabry-Perot gap. As the temperature of a sample changes, the shape of the temperature sensitive element undergoes a corresponding change which, thereby, alters the width of the Fabry-Perot gap. By examining the optical characteristics of light beams passing through the Fabry-Perot gap, a representation of the gap width can be ascertained. Accordingly, a change in the gap width is indicative of a change in the parameter to be measured.

DESCRIPTION OF THE PREFERRED EMBODIMENT

Figure 1:
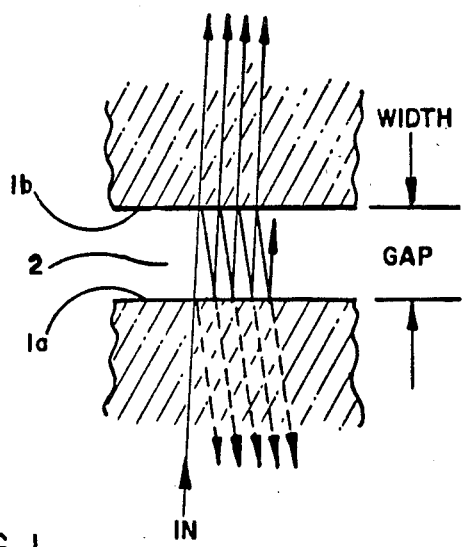
FIG. 1 shows the formation of and the optical principles associated with a Fabry-Perot cavity or gap.

Referring to FIG. 1 of the drawings, an incident beam of light, designated IN, is shown being partially transmitted through first and second optically flat and parallel surfaces 1a and 1b and partially reflected a plurality of times within a Fabrey-Perot cavity or gap 2 that is formed between surfaces 1a and 1b. Inasmuch as an inherent phase reversal occurs when light is reflected from a more dense medium (i.e. through surfaces 1a and 1b to be a less dense medium (i.e. to optical gap 2), it is possible for the main reflected light beams (shown dotted) to cancel in a gap 2 having a particularly dimensioned width that is equal to a multiple of half wavelengths of the incident light. The light beams that are transmitted through Fabrey-Perot gap 2 and surfaces 1a and 1b undergo an even number of reflections, so that, in the event of such a phase reversal, the even number of phase reversals produces no net phase reversal. Moreover, the components of light being transmitted through the gap 2 having a width equal to a half wavelength multiple are in supportive phase with one another, so that light transmission through gap 2 occurs. When the reflectivity at the surface 1a or 1b of a relatively dense material is high, a very large number of reflections is required before the amplitudes of the transmitted light beams add up to a resultant amplitude that is close to the amplitude of the incident beam of light IN. As a result, under conditions of high reflectivity, even a very small variation in the frequency of light causes the transmission characteristics thereof to decrease dramatically. Hence, in view of the foregoing well known principles, devices are available with a very narrow transmission band relative to the wavelength of light. One such device is known to those skilled in the art as a Fabrey-Perot etalon when the gap 2 between surfaces 1a and 1b is maintained constant. However, the aforementioned device is, otherwise, known as a Fabrey-Perot interferometer when the gap 2 between surfaces 1a and 1b is mechanically varied. Additional information regarding Fabrey-Perot principles in general can be found in the Handbook of Physics, 2d, published by McGraw-Hill, 1967, Section 7, Chapter 5, Part 6.

In accordance with the present invention, FIG. 2 of the drawings is illustrative of the preferred steps of a method, which uses the theory enumerated while referring to FIG. 1, for fabricating a Fabrey-Perot multiple beam fringe sensor that can be utilized within a compact fiber optic transmission system to provide an accurate digital indication of remote temperatures, pressures, and other physical parameters. Referring initially to FIG. 2(a) of the drawings, two well known optical glass or silica fibers 10 and 12 are shown, each fiber having one end which is spherically terminated. By way of example, a suitable supply of heat is applied to one end of each of optical fibers 10 and 12 until fused spheres 14 and 16 are respectively formed thereat. FIG. 2(b) is illustrative of a step of polishing each of the spherical ends 14 and 16 of optical fibers 10 and 12 so that enlarged flat surfaces 18 and 20 are respectively formed. Flat surfaces 18 and 20 are perpendicularly aligned with the longitudinal axes of corresponding optical fibers 10 and 12, whereby each fiber is hemispherically terminated. FIG. 2(c) is representative of a step of forming a raised cylindrical contact 22 on one of the polished flat surfaces 18 or 20 of corresponding optical fiber 10 or 12. By way of example, contact 22 may be formed by cementing a small, solid cylindrical piece of glass, quartz, or other suitable material having light transmissive properties that are similar to those of the flat polished surface 18 of optical fiber 10. As an alternative step, the polished surface 18 of optical fiber 10 may be ground, according to conventional procedures, until the raised, cylindrical contact 22 extends therefrom. In a preferred embodiment, the longitudinal axes of optical fiber 10 and raised cylindrical contact 22 are coincidentally aligned with one another. FIG. 2(d) indicates a step of applying (such as by means of cement, metal fusion, or the like) a hollow spacer 24 around the periphery of raised cylindrical contact 22. By way of example, spacer 24 may consist of a suitable metallic material. However, the materials used to form contact 22 and spacer 24 must have different temperature coefficients of expansion. FIG. 2(e) is illustrative of a step of shortening the raised cylindrical contact 22. Raised contact 22 may be polished or ground down, whereby the end surface thereof is recessed with respect to the end surface of spacer 24. In order to provide an accurate digital representation of a physical parameter, it is essential that the end surfaces of shortened cylindrical contact 22 and spacer 24 are maintained both very flat and in parallel alignment with one another to enable a suitable Fabrey-Perot gap to be formed.

In one preferred embodiment of the present invention, a technique by which to insure the desired flat and parallel characteristics of the end surfaces of cylindrical contact 22 and spacer 24 is disclosed as follows. Referring once again to FIG. 2(d), prior to the step of shortening raised cylindrical contact 22, the end surface of contact 22 and spacer 24 are finely polished so that a single plane exists thereacross. It is desirable for the planar end surfaces of contact 22 and spacer 24 to be made extremely flat, inasmuch as the number of light reflections that occur in a Fabrey-Perot interferometer or etalon increase according to the precision by which the end surfaces are characteristically matched. By way of particular example, a flatness of 1/20 to 1/100 of a wavelength is suitable for many Fabrey-Perot applications. By the nature of the small size which characterizes the multiple-beam fringe sensor to be disclosed herein, random flatness variations over the planar end surfaces of raised contact 22 and spacer 24 can be minimized, so that relatively less area is available for degrading variations. After the end surfaces of raised contact 22 and spacer 24 have been polished so as to precisely terminate along a single plane, raised contact 22 is, thereafter, shortened, as previously disclosed while referring to FIG. 2(e) of the drawings.

According to another preferred embodiment of the present invention, a technique for shortening cylindrical contact 22, so that the end surface thereof is recessed with respect to that of spacer 24, is described as follows. The raised contact 22 is initially ground or polished down to a suitable height at a reduced temperature, which temperature is lower than any of those to which the sensor is expected to be exposed. By virtue of the difference in expansion coefficients between glass or quartz contact 22 and metallic spacer 24, a height differential is produced when the present fringe sensor is exposed to higher operating temperature. Alternatively, another technique by which to achieve the height differential between the end surfaces of contact 22 and spacer 24 includes a step of utilizing a conventional vapor deposition process. More particularly, a suitable metallic material is vapor deposited around the outer periphery of cylindrical contact 22 until a desired spacer height is obtained.

Figure 2A:
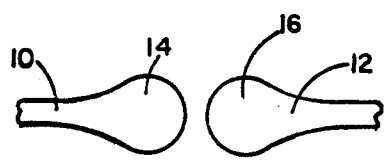
FIGS. 2(a)-(f) are illustrative of the steps of the preferred method utilized for making a Fabry-Perot multiple beam fringe sensor that forms one embodiment of the present invention.
Figure 2B:
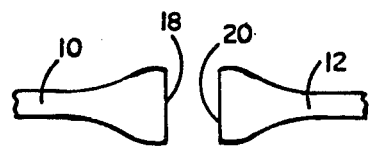
Figure 2C:
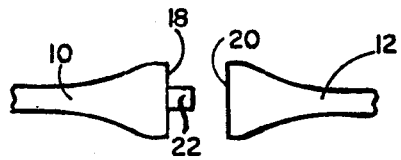
Figure 2D:
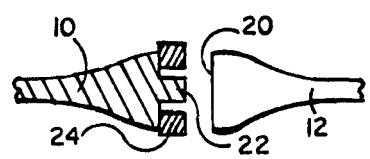
Figure 2E:
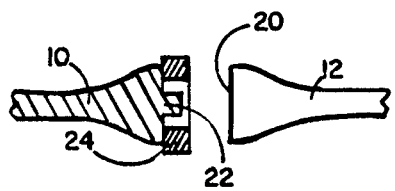
Figure 2F:
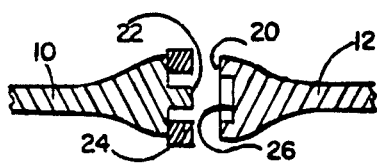

Yet another technique which includes utilizing a vapor deposition process for achieving the height differential between contact 22 and spacer 24 comprises the step of depositing a suitable metallic spacer material on the flat end surface 20 of matching optical fiber 12. This optional technique is illustrated in FIG. 2(f) of the drawings. More particularly, spacer material is selectively deposited around the perimeter of the flat end surface 20 of matching optical fiber 12 until a depression 26 is formed (such as by conventional photolithographic techniques) at the center thereof. Depression 26 is dimensioned and aligned so as to be adapted to receive the cylindrical contact 22 therein when end surface 20 of optical fiber 12 is mated with spacer 24 of optical fiber 10.

Figure 3:
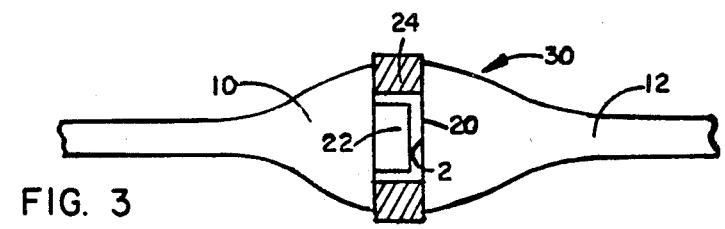
FIG. 3 shows the multiple beam fringe sensor assembled in accordance with the steps of the method disclosed while referring to FIGS. 2(a)-(f) of the drawings.

FIG. 3 shows a unique multiple-beam fringe sensor 30 formed in accordance with the steps of the method disclosed while referring to FIGS. 2(a)-2(e) of the drawings. In the assembled relationship, the polished, flat end 20 of optical fiber 12 is cemented directly to the flat end surface of spacer 24. In the assembled relationship of FIG. 3, a Fabrey-Perot gap 2 surrounds contact 22, inasmuch as contact 22 is recessed relative to the spacer 24, as previously disclosed. The width of gap 2 is defined as the distance between the flat end surfaces of contact 22 and optical fiber 12. The sensitivity of sensor 30 is dependent upon the ratio of Fabrey-Perot gap 2 width to the height of spacer 24. Gap 2 corresponds to that which was previously illustrated and described when referring to FIG. 1 of the drawings.

The multiple-beam fringe sensor 30 of the present invention has particular application as a temperature sensor, wherein spacer 24 is fabricated from a metal or other suitable material having an expansion coefficient larger than that of the optical glass or quartz from which optical fibers 10 and 12 are fabricated. However, it is to be understood that the multiple-beam fringe sensor 30 of FIG. 3 also has particular application as a pressure sensor, wherein spacer 24 is fabricated from an elastic material that is adapted to deform when exposed to anticipated pressure ranges. In this last-mentioned pressure sensor application, the flat optical end surfaces of the sensor fibers 10 and 12 must be maintained at a high degree of parallelism with respect to one another to obtain the desired Fabrey-Perot effect. Yet another application of the multiple-beam fringe sensor 30 of FIG. 3 is that of a gas-density sensor, wherein the density of gas is measured according to the change in the index of refraction of light passing therethrough. In operation, gas, admitted to the sensor gap 2 which surrounds cylindrical contact 22, causes the optical path length of the incident light to change according to the density and index of refraction of the particular gas sample. In this application, however, spacer 24 and optical fiber 10 are fabricated from an identical material. More particularly, a gas density sensor formed in accordance with the teachings above would preferably include a fixed Fabrey-Perot gap, whereby the index of refraction of a gas sample could be determined, and a tunable Fabrey-Perot gap, whereby the absorption characteristics and chemical constituency of the gas sample could also be determined.

Figure 4:
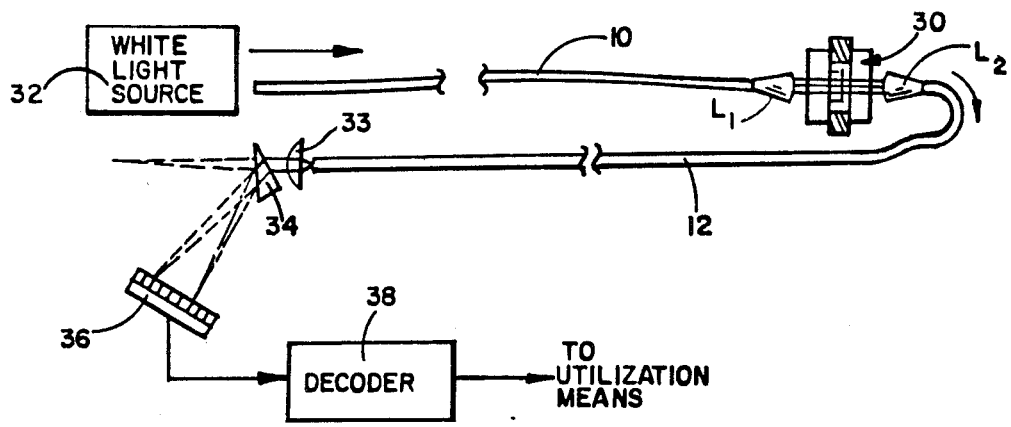
FIG. 4 shows the interconnection of the Fabry-Perot sensor of FIG. 3 with a compact fiber optic transmission system for measuring physical parameters of remote samples.

A compact, inexpensive fiber optic transmission system that incorporates the multiple-beam fringe sensor 30 of FIG. 3 to provide digital representations of physical parameters is illustrated in FIG. 4 of the drawings. One end of optical fiber 10 is connected to a source 32 of white light. The second end of fiber 10 terminates in the formation of sensor 30 via an input lens $L_1$. One end of optical fiber 12 also terminates in the formation of sensor 30 via an output lens $L_2$, as previously disclosed. Lenses $L_1$ and $L_2$ can be formed integrally with the ends of fibers 10 and 12, if so desired. The second end of fiber 12 is aligned with a suitable focusing lens 33. Output light signals that are transmitted from sensor 30 via fiber 12 and lens 33 are focused on a suitable light dispersing means, such as a prism 34, for breaking up the spectrum of the optical information signals provided by sensor 30. A suitable photo-detector 36 is interfaced with prism 34 so as to detect and amplify the spectrum of the light signals emitted therefrom. By way of example, photo-detector 36 comprises a conventional linear array of charge coupled devices. Particular charge coupled devices of photo-detector 36 are selectively activated by light that is dispersed by prism 34, in order to provide an electrical representation of a particular physical parameter (e.g. temperature) to be measured, depending upon the wavelength or color of the transmitted optical information signals. The output of photo-detector 36 is connected to the input of a decoder 38. Decoder 38 is adapted to receive the output electrical signals from photo-detector 36, so that a digital representation of the physical parameter may be supplied, in a well known coded signal format, to a utilization means, such as a micro-processor, a computer, or the like, for the purpose of data storage or for further processing. More particularly, a microprocessor may store an algorithm required for decoding the electrical output signals from photo-detector 36. Alternatively, the decoding process could be combined as part of the overall function of a larger computer system.

Figure 5:
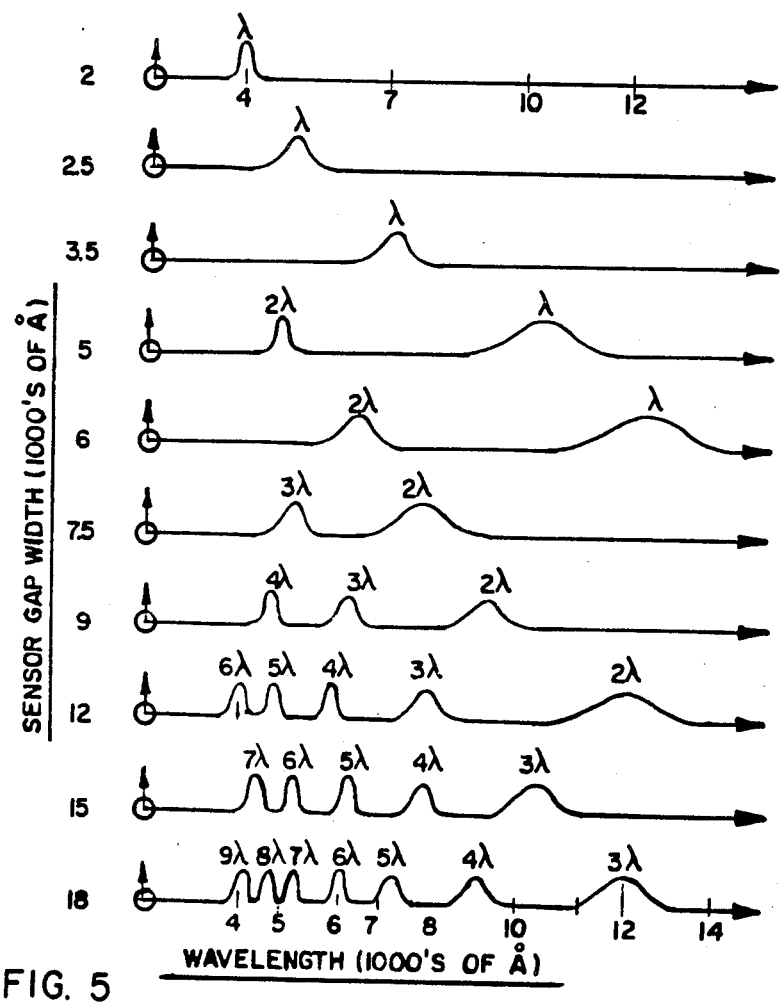
FIG. 5 is graphically indicative of the transmitted light spectra at various Fabry-Perot sensor gap widths when an incident light source is applied to the transmission system of FIG. 4

By employing a white light source 32 to provide incident light signals to the multiple-beam fringe sensor 30 of the fiber optic transmission system in FIG. 4, only those particular wavelengths that are equal to the half wavelength multiples of Fabrey-Perot sensor gap width are transmitted to photo-detector means 36. The transmitted light spectra at various sensor gap widths is represented in FIG. 5 of the drawings. FIG. 5 indicates that the wavelengths of the transmitted incident white light increase proportionately with an increase in the sensor gap width. Moreover, as the wavelength of the transmitted light surpasses the visible region and enters the infrared region, a new spectral line appears in the visible region, which line tends to move towards longer wavelengths with increasing Fabrey-Perot sensor gap width. This aforementioned pattern is repeated as the sensor gap continues to increase in width. Although, at larger gap widths, the spectral lines moving across the spectrum are a repetition of lines which move across the spectrum at smaller gap widths, the entire spectrum at any one gap width is not duplicated, inasmuch as additional spectral lines appear during the repetitions. By way of example, at a sensor gap width of 6000 Å, a 2λ line appears at a wavelength of 6000 Å. At a gap width of 9000 Å, a 3λ line also appears at a wavelength of 6000 Å. However, at the 9000 Å gap width, 4λ and 2λ lines also appear at wavelengths of 4500 Å and 9000 Å, respectively, so as to particularly distinguish a 9000 Å sensor gap width from a 6000 Å sensor gap width. As a further example, at a sensor gap width of 12000 Å, a 4λ line appears at a wavelength of 6000 Å. However, the remainder of the 12000 Å pattern is, accordingly, clearly distinguishable from the corresponding patterns at gap widths of 9000 Å and 6000 Å.

By virtue of the foregoing technique for sensing a change in the optical characteristics of sensor 30 when illuminated by a white light source, output information signals from decoder 38 (in FIG. 4) can provide an accurate indication of the Fabry-Perot gap width of sensor 30 over a range of several wavelengths. Therefore, after sensor 30 is calibrated to account for various initial conditions, the indicated change of Fabry-Perot gap width can be proportional to the change in a particular physical parameter (e.g. temperature) to be measured.

Figure 6:
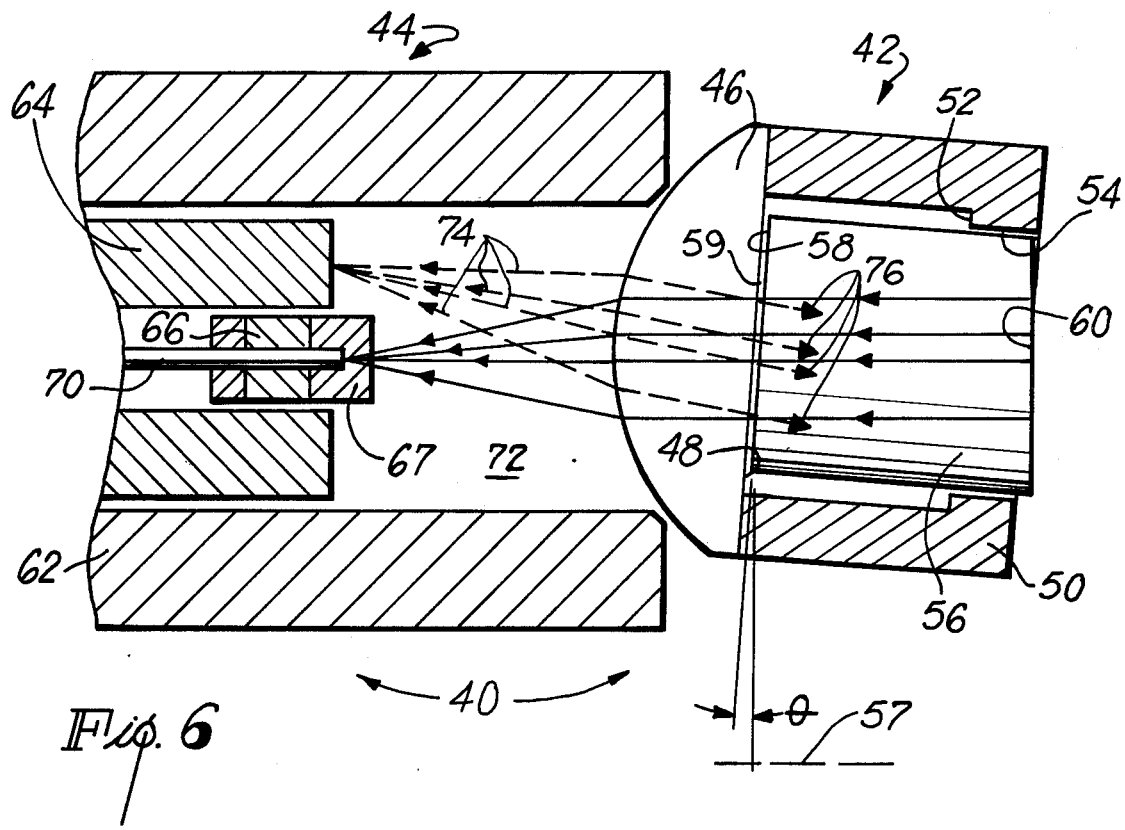
FIG. 6 shows a front view, partially in cross section, of a Fabry-Perot multiple beam fringe sensor that forms another embodiment of the present invention.
Figure 7:
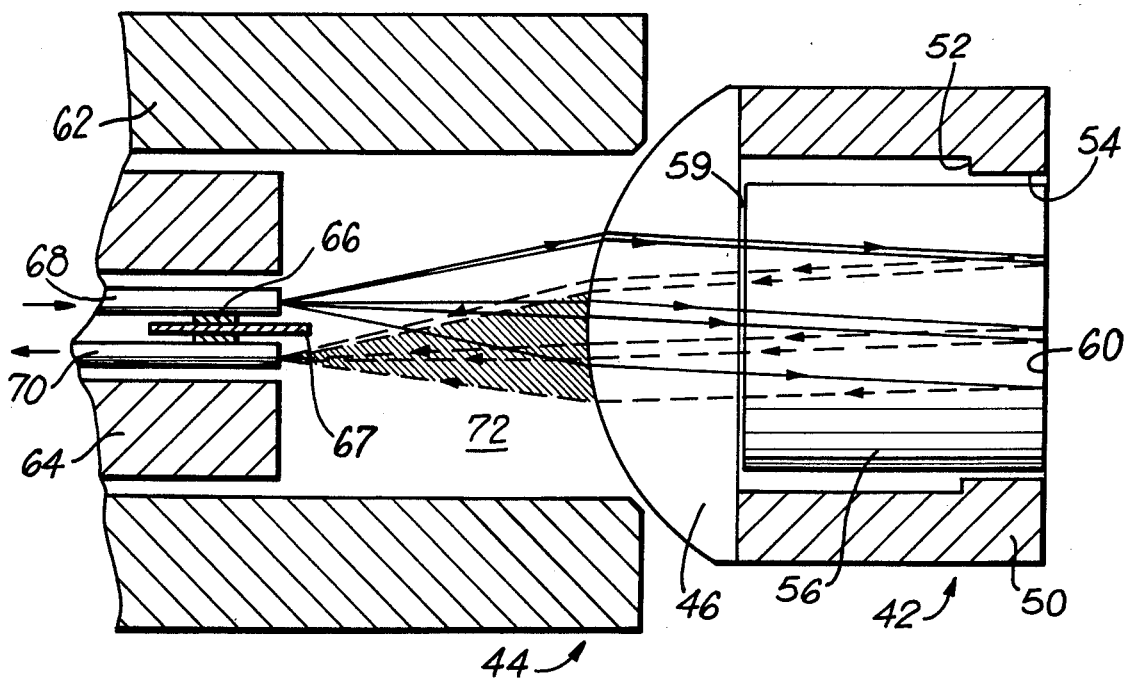
FIG. 7 shows a top view, partially in cross section, of the Fabry-Perot multiple beam fringe sensor of FIG. 6.

In accordance with a second preferred embodiment of the present invention and referring concurrently to FIGS. 6 and 7 of the drawings, another Fabry-Perot multiple beam fringe transducer assembly 40 is disclosed which is responsive to a physical parameter. The transducer 40 has particular application as a temperature sensor that is suitable for providing a digital representation of the temperature of a remote sample. Transducer assembly 40 includes a sensor subassembly 42 and a fiber subassembly 44. The sensor subassembly 42 is formed of three parts. The first part is a conventional plane-convex lens 46 which is, typically, 2.5 mm in diameter and 0.8 mm thick with a focal length of 1.6 mm. The radius of curvature of the convex surface of lens 46 is typically 1.41 mm. One example of an available lens which is suitable for utilization herein is part No. 01-LPX-413, manufactured by Melles Griot. The plano side 48 of the lens 46 is covered with a Fabry-Perot coating. By way of example, the Fabry-Perot coating may be a thin, partially reflecting, partially transmitting layer of aluminum.

The second part of the sensor subassembly 42 is a temperature responding element 50. More particularly, temperature responding element 50 comprises a miniature metal tube-like structure. The plano side 48 of the lens 46 is cemented to one end of temperature responding tube 50. Tube 50 may be formed from a suitable material, such as copper, aluminum, or the like. However, the metal used to form temperature responding tube 50 is selected so that the temperature coefficient of expansion thereof is different (e.g. greater) than that of glass, whereby metal tube 50 will undergo an expansion in response to increasing temperature prior to an expansion experienced by the third part of sensor subassembly 42. The metal tube 50 is provided with an internal step 52 to block the flow of a suitable cement, which cement is applied through a joint 54 by means of capillary action or any other suitable technique in order to provide a way by which to secure temperature responding element 50 to the third part of the sensor subassembly 42.

The third part of the sensor subassembly 42 is a centrally disposed, solid cylindrical element 56 that is surrounded by and connected to temperature responding tube 50. The cylindrical element 56, which may be formed from a fused silica or similar glass-like material, has a partially transmitting, partially reflecting Fabry-Perot coating (which may be identical to that covering side 48 of lens 46) applied to one end 58 thereof, which end is positioned adjacent the plano side 48 of lens 46, so that a Fabry-Perot cavity or gap 59 of narrow width is formed therebetween. In the assembled relationship and as best shown in FIG. 6, the sensor subassembly 42 is tilted relative to the longitudinal axis (the direction of which is indicated by the reference line 57) of the fiber subassembly 44, so that the Fabry-Perot end 58 of the cylindrical element 56 is aligned to make an angle, designated $\theta$, with the perpendicular axis of the fiber subassembly 44. By way of example, the angle $\theta$ is approximately 5°. The opposite end 60 of cylindrical element 56 is provided with a suitable mirror surface, such as, for example, a thick coating of aluminum. The mirror end 60 of element 56 is formed, so that, in the assembled relationship, end 60 is aligned in a parallel relationship with the perpendicular axis of fiber subassembly 44.

The fiber subassembly 44 includes two concentrically arranged, stainless steel tubes 62 and 64, a nonconductive spacer 66, and at least one of each of a driving and sensing optical fiber 68 and 70. Outer and inner tubes 62 and 64 are secured to one another by means of cement, or the like. In the assembled relationship, the length of the outer tube 62 extends beyond the termination of the working end of inner tube 64. Optical fibers 68 and 70 are received by and maintained in proper alignment with one another and with the sensor subassembly 42 by means of a spacer 66. The spacer 66 is positioned (e.g. preferably cemented) inside the working end of tube 64. As is best shown in FIG. 7, spacer 66 has an elongated divider member 67 that extends between and past the termination of optical fibers 68 and 70, so as to prevent stray light from undesirably passing directly from the driving fiber 68 to the sensing fiber 70. In the assembled relationship, the convex surface of lens 46 is cemented to the outer tube 62, whereby to form an optical coupling cavity 72, in which, as will be described in greater detail hereinafter, efficient optical coupling occurs between the sensor subassembly 42 and the ends of the driving and sensing optical fibers 68 and 70 of the fiber subassembly 44. Those illustrated portions of each of the optical fiber 68 and 70 that form fiber subassembly 44 are shown with their respective plastic protective jackets removed.

It is to be understood that prior to the cementing together of outer and inner tubes 62 and 64 and lens 46 to outer tube 62, the inner tube 64, including fibers 68 and 70 mounted therein, may be moved axially, while the sensor subassembly 42 can be rotated about two axes until maximum light output is found to occur. The angle $\theta$ and the precise location of inner tube 64 within outer tube 62 are, therefore, determined when a light beam that is reflected by the sensor subassembly 42 can be focused directly on the fiber subassembly 44. Hence, the concentric, double tube construction of fiber subassembly 44 permits focusing adjustment prior to final assembly of the transducer 40.

In operation, an input (e.g. white) light source (not shown) is applied to the driving optical fiber 68. Incident light signals that are transmitted through optical fiber 68 (represented by solid lines in FIG. 7) are collected by the lens 46. The incident light signals are transmitted through lens 46 in the form of parallel light beams. The parallel light beams exit the plano side 48 of lens 46 and pass through the Fabry-Perot gap 59. Transmitting parallel light beams through the Fabry-Perot gap 59 advantageously avoids the introduction of errors that might otherwise be produced by a variable pathlength which is typically associated with a spherical wavefront. The parallel light beams are then transmitted through the cylindrical center element 56 of sensor subassembly 42 and reflected off the mirror end 60 of element 56. As is best shown in FIG. 7, the reflected parallel light beams accordingly pass through the Fabry-Perot gap 59 a second time (represented by dashed lines in FIG. 7), whereupon output light signals are focused onto the sensing optical fiber 70 via lens 46.

Because of the previously disclosed alignment (i.e. tilting) of sensor subassembly 42 relative to the longitudinal axis of fiber subassembly 44, incident and reflected light beams that pass through the Fabry-Perot gap 59 form the angle $\theta$ with said longitudinal axis. The disclosed transmission angle $\theta$ is advantageous for preventing a portion of the incident light beams that reflects off the partially reflecting Fabry-Perot surfaces 48 and 58 of lens 46 and cylindrical element 56, respectively, from being undesirably focused back onto the sensing optical fiber 70. More particularly, by tilting sensor subassembly 42, as disclosed, those incident light beams that are reflected at Fabry-Perot surfaces 48 and 58 are prevented from recombining at the sensing fiber 70 with that portion of the incident light beams that is transmitted through the Fabry-Perot gap 59 and reflected off the mirror end 60 of cylindrical element 56. Thus, by virtue of introducing the disclosed transmission angle $\theta$, a technique is provided by which to substantially minimize a possible decrease in resolution and the resulting loss of information contained by output light signals that are transmitted via sensing fiber 70. Accordingly, as is represented by the dashed, parallel lines 74 of FIG. 6, those unwanted light beams that are initially reflected at the Fabry-Perot gap 59 are directed away from the sensing fiber 70 (e.g. in a direction towards inner tube 64).

As will be known to those skilled in the art, a Fabry-Perot wavelength filter (such as transducer assembly 40) has the characteristic that light not transmitted therethrough is reflected, and vice versa. Thus, if the unwanted light beams 74 that are initially reflected at gap 59 were to be mixed with the light beams that are transmitted through gap 59 and reflected at mirror 60, considerable loss in wavelength definition could result. Inasmuch as the transmitted incident light beams pass through the Fabry-Perot gap twice, as previously disclosed, any energy removed therefrom during the first transmission through gap 59 is, during the second transmission, added back to the output light signals that are ultimately supplied to the sensing optical fiber 70. Moreover, by virtue of the twice through transmission, the shape of the output light signals is sharpened, whereby the bandpass of the wavelength filter (i.e. transducer assembly 40) is more narrowly defined, to thereby improve the accuracy by which assembly 40 indicates temperature, or the like. What is more, the unwanted, initially reflected light beams 74 do not pass through gap 59 a second time, but are directed away from sensing fiber 70.

As is represented by the dashed, parallel lines 76 in FIG. 6, light is also reflected from Fabry-Perot surfaces 58 and 48 during the second transmission of light beams (corresponding to the reflections from the mirror surface 60 of cylindrical element 56) through Fabry-Perot gap 59. However, it has been found that these unwanted secondary reflected light beams 76 show little tendency to become focused upon the sensing optical fiber 70, inasmuch as they are initially reflected in a direction away from sensing fiber 70. More particularly, portions of these unwanted secondary reflected light beams 76 have been found to diverge at various angles, thereby resulting in highly dispersed light. Moreover, the secondary reflections 76 have previously had unwanted wavelengths removed therefrom by virtue of the first transmission of incident light beams through the Fabry-Perot gap 59. Those portions of the unwanted secondary reflected light beams 76 that are not absorbed by the sensor subassembly 42 eventually pass through gap 59 and into the optical cavity 72 near the location of the sensing optical fiber 70. However, by the time that the unwanted secondary reflections reach the sensing fiber 70, said reflections are both considerably attenuated and highly diffused, so as to be of no consequence to the integrity of the information contained by the output signals that are transmitted by sensing fiber 70.

The multiple beam fringe transducer assembly 40 just disclosed and illustrated in FIGS. 6 and 7 of the drawings may be incorporated with a compact fiber optic transmission system. One such suitable transmission system is that previously disclosed when referring to FIG. 4 of the drawings. As will be appreciated by those skilled in the art, the transducer assembly 40 of the present embodiment may be substituted for the sensor assembly 30 of FIG. 4, whereupon an accurate digital representation of a physical parameter (e.g. temperature) may be transmitted to a suitable detector.

More particularly, the width of the Fabry-Perot gap 59 of assembly 40 is altered as the shape of the temperature sensitive metal tube 50 of sensor subassembly 42 changes in response to a corresponding parameter change. The different wavelengths of the output light signals that are twice passed through gap 59 and reflected onto sensing optical fiber 70 as the width of gap 59 changes with temperature are shown in and previously described when referring to FIG. 5 of the drawings. Thus, in accordance with the teachings of FIG. 5, when driving optical fiber 68 is illuminated by a suitable input (e.g. white) light source, the optical characteristics of the output light signals transmitted to sensing optical fiber 70 can provide a representation of the Fabry-Perot gap width of sensor 40 over a range of several wavelengths. After calibrating sensor 40 to account for various initial conditions, the change of Fabry-Perot gap width can be detected so as to provide an accurate indication of the change of a physical parameter, such as temperature, to be measured from a remote sample.

The particular configuration of the transducer assembly 40 just described is advantageous for several reasons. The fiber subassembly 44 is adapted to orient both the driving and sensing optical fibers 68 and 70 in the same direction. Fibers 68 and 70 are well protected, inasmuch as the bare ends thereof are surrounded by the inner steel tube 64. Moreover, all of the light energy that passes through the Fabry-Perot gap 59 is transmitted as a plano wave (i.e. parallel light beams), so that the wavelength of peak transmission does not change as a result of varying angles (as would otherwise occur with a spherical wavefront). What is more, the construction of a transducer assembly 40 is separated into two subassemblies 42 and 44 which may be constructed and tested separately before being mated. What is still more, the present transducer assembly is relatively inexpensive to manufacture, consumes little space, and is adapted to provide an accurate, digital representation of a parameter sensed from a remote sample.

It will be apparent that while a preferred embodiment of the invention has been shown and described, various modifications and changes may be made without departing from the true spirit and scope of the invention. For example, both the method of fabrication and the unique Fabry-Perot sensors disclosed herein have particular application to avionics, medicine, and to any other use where an accurate digital representation of a physical measurement is desired.

Having thus set forth a preferred embodiment of the present invention, what is claimed is:

1. An optical transducer for sensing a physical parameter, said transducer comprising:
   first and second light transmitting means, and
   Fabry-Perot gap means,
   said first light transmitting means positioned so as to supply incident light signals to said Fabry-Perot gap means,
   said second light transmitting means positioned so as to receive output light signals that pass through said Fabry-Perot gap means, said Fabry-Perot gap means having a dimension that is sensitive to change in the parameter, the spectral characteristics of the output light signals passing through said Fabry-Perot gap means to said second light transmitting means providing an indication of the dimension of said gap means and, accordingly, the physcial parameter to be sensed,
   said Fabry-Perot gap means being tilted relative to a reference plane that is aligned perpendicular to the optical axis of said first light transmitting means.

2. The optical transducer recited in claim 1, further comprising a mirror surface,
   said Fabry-Perot gap means positioned between said first light transmitting means and said mirror surface, whereby incident light signals that pass through said gap means a first time are reflected from said mirror surface and pass through said gap means a second time before being received by said second light transmitting means,
   the respective path lengths of said incident and reflected light signals that pass a first and second time through said Fabry-Perot gap means being substantially identical with respect to one another,
   the tilt of said Fabry-Perot gap means preventing, at said second light transmitting means, the recombination of incident light signals being reflected from said Fabry-Perot gap means with output light signals being reflected from said mirror surface.

3. The optical transducer recited in claim 1, wherein the angle of transmission made by said incident light signals passing through said Fabry-Perot gap means is approximately 5°.

4. The optical transducer recited in claim 1, wherein the respective longitudinal axes of at least the light supplying end of said first light transmitting means and the light receiving end of said second light transmitting means are aligned in a parallel relationship with one another.

5. The optical transducer recited in claim 1, further comprising a parameter responsive means surrounding said Fabry-Perot gap means,
   the shape of said parameter responsive means being adapted to change with a corresponding parameter change, whereby to alter the dimension of said gap means and thereby provide an indication of said parameter to be sensed.

6. The optical transducer recited in claim 1, further comprising first tubular means for surrounding and retaining therein portions of each of said first and second light transmitting means, and
   second tubular means surrounding said first tubular means and connected to said Fabry-Perot gap means, said first and second tubular means being arranged concentrically with respect to one another,
   said first tubular means being adapted to move axially relative to said second tubular means, whereby to adjust the focus of the output light signals that are received by said second light transmitting means.

7. The optical transducer recited in claim 1, wherein each of said first and second light transmitting means includes at least one optical fiber.

8. The optical transducer recited in claim 1, further comprising light focusing means having a planar surface and a convex surface,
   said planar surface thereof forming one side of said Fabry-Perot gap means, and
   said convex surface thereof being aligned to receive the incident light signals supplied by said first light transmitting means, whereby the incident light signals passing through said gap means comprise parallel light beams.

9. The optical transducer recited in claim 8, wherein the planar surface of said light focusing means is aligned so as to make an angle with the perpendicular axis of the light supplying end of said first light transmitting means.

10. The optical transducer recited in claim 1, further comprising third light transmitting means,
    one end of said third light transmitting means forming one side of said Fabry-Perot gap means, and
    the other end of said third light transmitting means comprising a mirror surface, whereby incident light signals that pass through said Fabry-Perot gap means are reflected from said mirror surface, said reflected light signals again passing through said gap means before being received by said second light transmitting means.

11. The optical transducer recited in claim 10, wherein the mirror surface of said third light transmitting means being aligned in a substantially parallel relationship with the perpendicular axis of the light supplying end of said first light transmitting means.

12. The optical transducer recited in claim 1, including means for detecting the spectral characteristics of said output light signals so as to provide the indication of said parameter.

13. The optical transducer recited in claim 1, wherein said optical transducer is a temperature sensor.

14. An optical transducer for sensing a physical parameter, said transducer comprising:
    white light source means, light supplying means for providing a supply of incident light signals from said source means, light receiving means, mirrored surface means having at least one planar surface thereof, light focusing means positioned to receive said incident light signals from said light supplying means and to direct said signals upon the planar surface of said mirrored surface means, said light focusing means having at least one planar surface thereof, and Fabry-Perot gap means formed between the planar surfaces of said light focusing means and said mirrored surface means, so that the incident light signals being directed upon the planar surface of said mirrored surface means pass through said Fabry-Perot gap means and light signals being reflected from the planar surface of said mirrored surface means pass again through said Fabry-Perot gap means, said reflected signals being received at said light receiving means, the respective path lengths of each of said incident and reflected light signals that pass through said Fabry-Perot gap means being substantially identical with respect to one another, said Fabry-Perot gap means having a dimension that is sensitive to a change in the parameter to be sensed, the spectral characteristics of the reflected light signals passing through said Fabry-Perot gap means from said mirrored surface means to said light receiving means providing an indication of the dimension of said gap means, and accordingly, the physical parameter, said Fabry-Perot gap means being tilted relative to a reference plane that is aligned perpendicular to the optical axis of said light supplying means so as to prevent the recombination at said light receiving means of incident light signals being reflected from said Fabry-Perot gap means with the light signals being reflected from said mirrored surface means.

15. The optical transducer recited in claim 14, further comprising a parameter responsive means surrounding said Fabry-Perot gap means and connected between the planar surfaces of said light focusing means and said mirrored surface means, the shape of said parameter responsive means changing with a corresponding parameter change, so as to alter the dimension of said Fabry-Perot gap means and thereby provide an indication of the parameter to be sensed.

16. The optical transducer recited in claim 14, including means for detecting the spectral characteristics of the light signals being reflected through said Fabry-Perot gap means from said mirrored surface means to said light receiving means, so as to provide the indication of said parameter.

17. The optical transducer recited in claim 14, wherein said light focusing means also includes a convex surface for receiving the light signals from said light supplying means, said convex surface adapted to transmit parallel aligned light signals to said mirrored surface means via said Fabry-Perot gap means.

18. The optical transducer recited in claim 14, wherein said optical transducer is a temperature sensor.

* * * * *